Feb. 16, 1965   G. THIRUP   3,169,606
MAGNETIC CORE CONTROL CIRCUIT FOR ELEVATORS
Filed July 3, 1962   5 Sheets-Sheet 1

INVENTOR
Gunnar Thirup
BY Stevens, Davis, Miller & Mosher
ATTORNEYS

Feb. 16, 1965 G. THIRUP 3,169,606
MAGNETIC CORE CONTROL CIRCUIT FOR ELEVATORS
Filed July 3, 1962 5 Sheets-Sheet 5

INVENTOR
Gunnar Thirup
BY Stevens, Davis, Miller & Mosher
ATTORNEYS

United States Patent Office
3,169,606
Patented Feb. 16, 1965

3,169,606
MAGNETIC CORE CONTROL CIRCUIT
FOR ELEVATORS
Gunnar Thirup, Tyrsbjergvej, Korup, Denmark, assignor to Thomas B. Thrige, Odense, Denmark
Filed July 3, 1962, Ser. No. 207,306
Claims priority, application Denmark, July 10, 1961, 2,826; Sept. 2, 1961, 3,503
17 Claims. (Cl. 187—29)

The driving plant for lifts consists of the motor with gears, winch and brake, viz. the parts which produce and transfer the required mechanical energy; further the plant comprises contactors operating said parts, and a control circuit arrangement which processes the public's calls and, if desired, also the signals determined by a fixed programme and converts such signals into operating orders for the contactors. The known control circuit arrangements are composed of relays, push-buttons, switches, etc., i.e. of members with mechanically moved parts which are subject to wear, and comprising contacts whose contact resistance is dependent on the condition of the surface and on the contact pressure, i.e. factors which vary with time and require a continuous attendance and inspection if disturbances are to be avoided. Further, mechanically moved parts create noise which may be inconvenient in dwelling houses and office buildings.

It is therefore a general object of this invention to improve these conditions in a control circuit arrangement for lifts and other plants used as a conveyor, for example, in parking houses, storage buildings, etc., where the load is to be moved vertically or horizontally from and to definite places, and it is therefore suggested according to the invention to replace the relays of known control circuit arrangement by electronic elements such as transistors, flip-flops, memory cores, etc.

According to the invention, having horizontal rows and vertical columns memory cores are to be arranged in a matrix all cores receiving information regarding a floor being arranged in a horizontal row. Each horizontal row is associated with circuit passed by interrogating pulses which occur as a function of time typical for each row and are of such size that each pulse is capable of bringing a core from the state of saturation (1-state) orginating from an information pulse to the other state of saturation (0-state). When the core is brought from the 1-state to the 0-state, a pulse is generated in a circuit which is common to all cores subject to the same type of information regarding the different floors and placed in a vertical column, said pulse determining alone or in common with other pulses the nature of the operating order.

Figure 1:
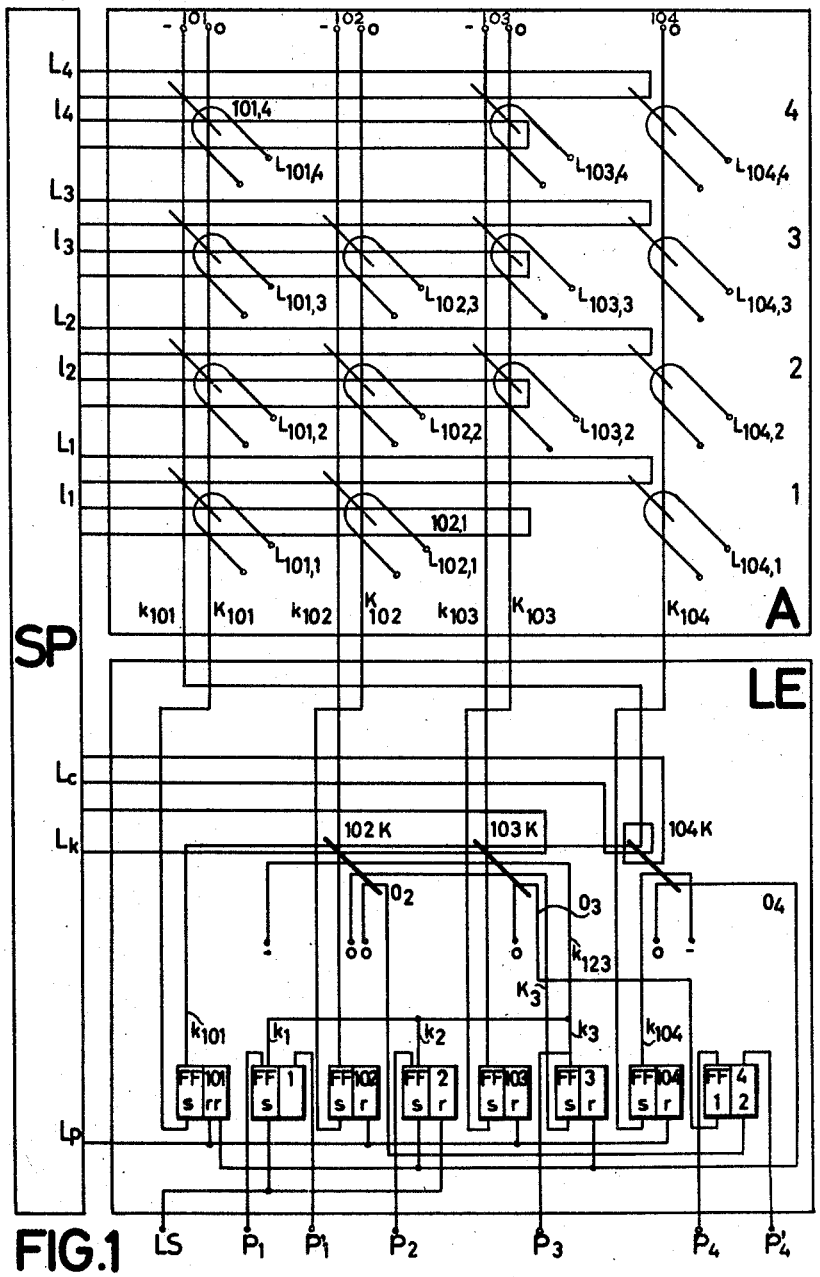
Figure 2:
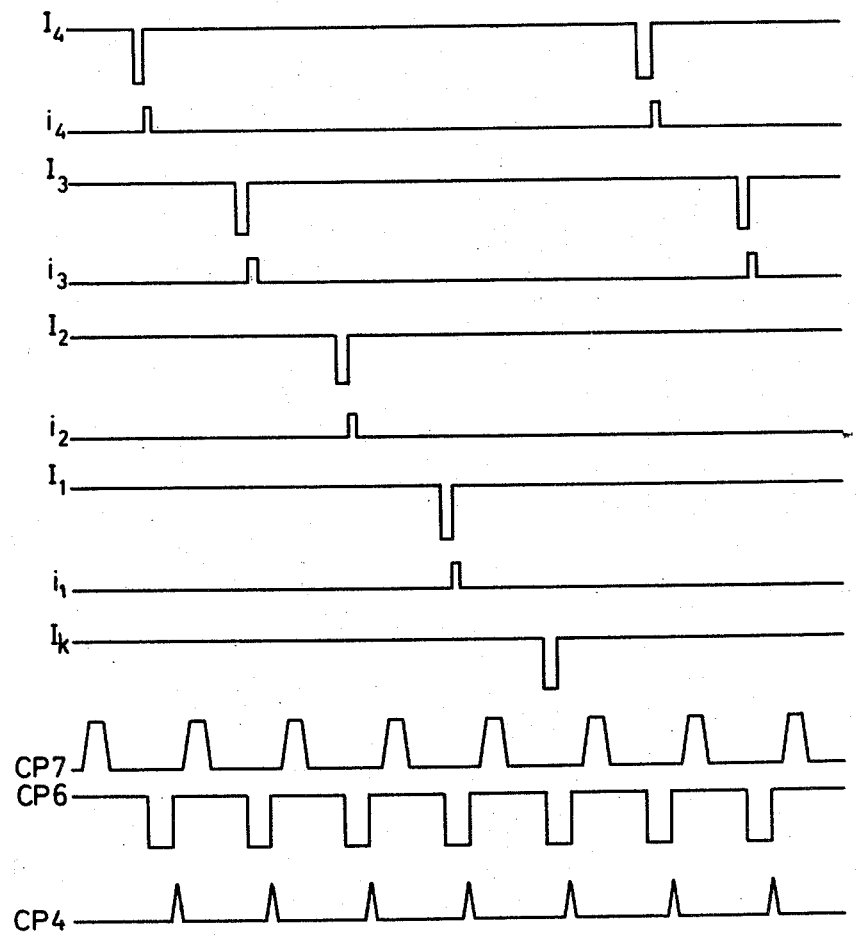
Figure 3:
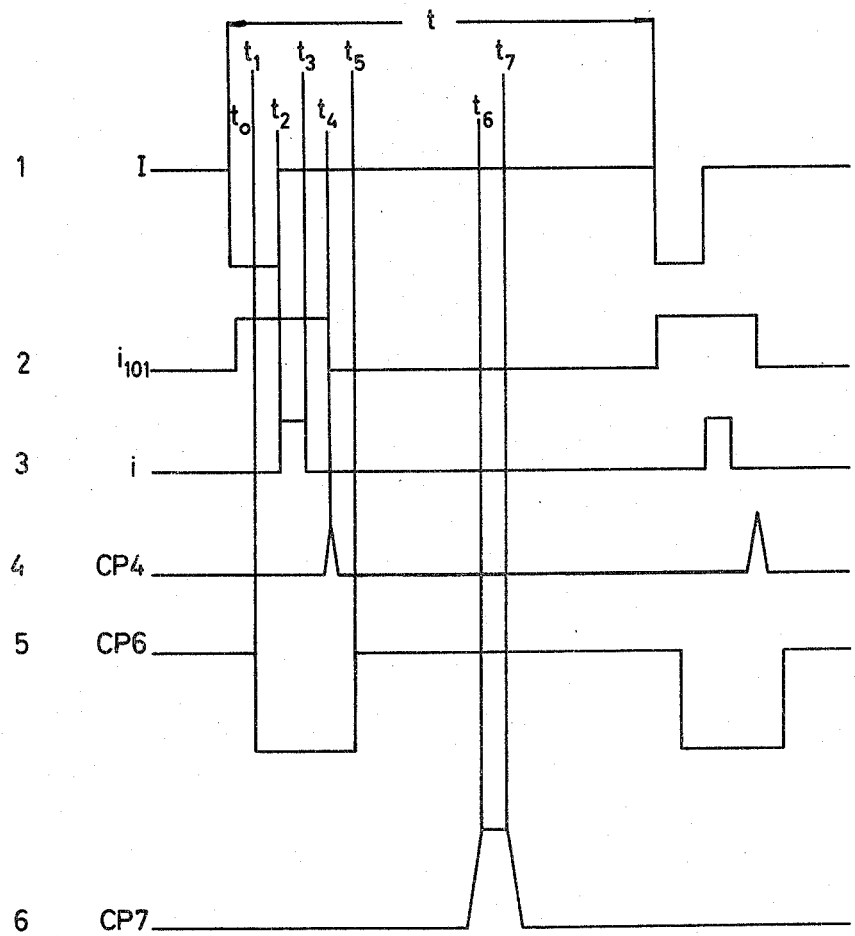
Figure 4:
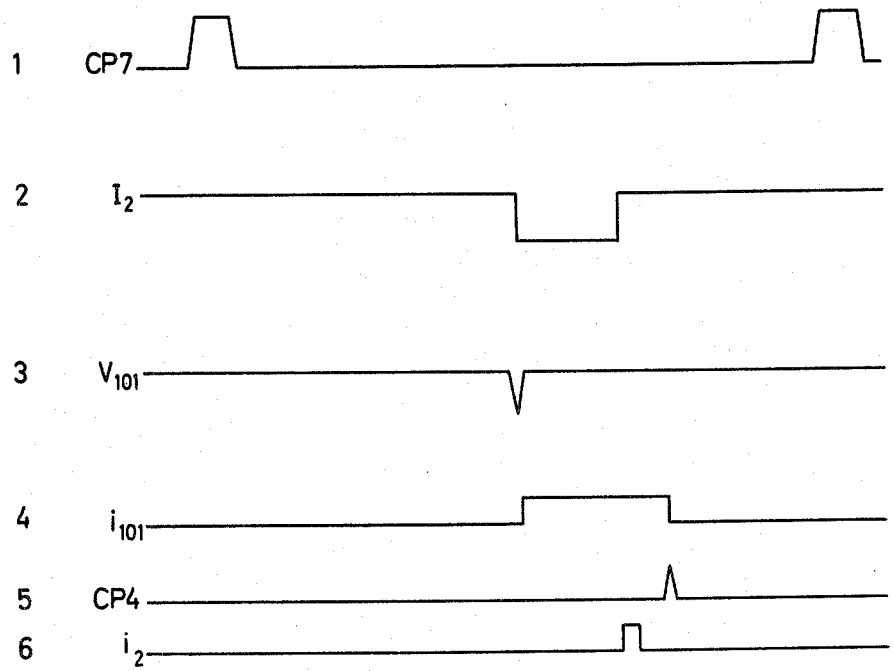
Figure 5:
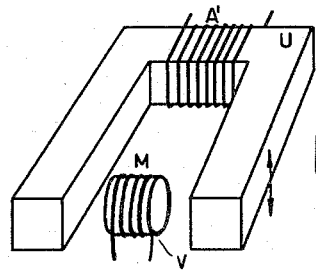
Figure 6:
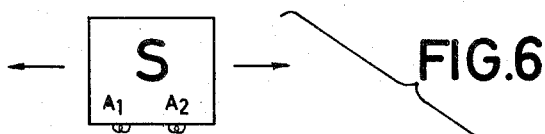
Figure 7:
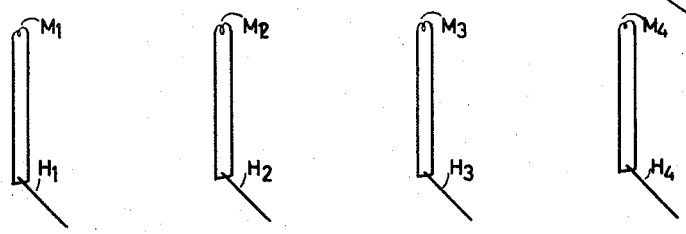
Figure 7:
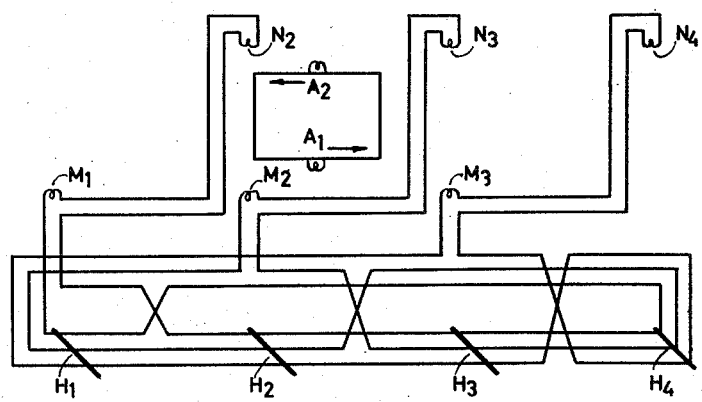

The invention will by way of example be explained in the following with reference to the accompanying drawing, in which FIG. 1 shows a circuit diagram for a control circuit arrangement for a lift cage, FIG. 2 shows a time diagram of the most important pulses occurring periodically in the control circuit arrangement of FIG. 1, FIG. 3 shows the mutual time displacement of the pulses, FIG. 4 shows the pulses occurring in connection with an interrogating pulse when said pulse reverses the magnetization of a core in the matrix, FIG. 5 shows an arrangement for transferring signals from the lift cage to the lift shaft, FIG. 6 shows a circuit for an arrangement according to FIG. 5, FIG. 7 shows a circuit arrangement according to the same principle as the one shown in FIG. 6, however, with error correction.

The diagram shown in FIG. 1 describes the invention in its simplest form and, consequently, relates to a control circuit arrangement for a lift, comprising a cage which travels between four floors. The control circuit arrangement consists of matrix A comprising memory cores, of an interrogating unit SP, which generates interrogating pulses and transmits such pulses to the matrix A, and of a logical unit LE where the pulses transmitted from the matrix are processed and re-transmitted in the form of operating orders to the contactors of the lift.

The memory cores in the matrix A are arranged in horizontal rows 1, 2, 3 and 4 and in vertical columns 101, 102, 103 and 104, each core being designated by the number of the column and the row, e.g. 101,4 or 102,1. In each the rows 1–4 such cores are arranged as receive information regarding a floor, for example row No. 1 is assigned to floor No. 1, etc. The information is transmitted in the form of current pulses through the lines $L_{101,4}$, $L_{101,3}$, etc. to the corresponding cores 101,4, 101,3 etc. Information of the same nature is stored in one and the same column; the public's orders for example, are stored in column 101 by the cores of the rows corresponding to the floors to which the cage is to be moved, the cores being magnetized in a positive sense, i.e. the cores are brought from the original 0-state into the 1-state.

A core in column 102 being magnetized in a positive sense indicates that the cage is above the floor in question, and a core in column 103 being magnetized in a positive sense indicates that the cage is below the floor in question. A positively magnetized core in column 104 indicates that the cage is passing one of the two points in the shaft, where braking signals are emitted if the cage has to be stopped at the floor in question, i.e. the next following floor reckoned from the floor above or below. At the top floor, the core in column 102 may consequently be omitted, and in the bottom floor, the core in column 103 may be omitted.

A line $L_1$, $L_2$, $L_3$, $L_4$, respectively, passes through all of the cores. These lines are continually passed by a pulse train, which is typical for each row, the course of said train appearing from FIG. 2 wherein the trains $I_1$, $I_2$, etc. represent the pulses of rows 1, 2, etc. The pulses emitted from the interrogating unit SP occur with negative sign and are of such a magnitude that a positive premagnetized core (in the 1-state) can be brought into the negative state of saturation (0-state).

As will be seen, the pulses in each row have the same frequency, but pulses of subsequent rows are delayed a certain period of time $t$, for example 1 ms. with respect to each other. Besides the pulse trains $I_1$–$I_4$, there is a pulse train $I_K$ which is not assigned to any floor or matrix row and which has a course corresponding to a row lying below the lowermost matrix row. The time difference between the $I_K$ pulse and the pulse $I_4$ o f the topmost row is the same as that between the other pulse rows, namely $t$.

Through the cores of each row in FIG. 1 are passed further conductors $l_1$, $l_2$, $l_3$, $l_4$, which are passed by current pulses $i_1$, $i_2$, $i_3$ and $i_4$. These pulses have, as will appear from FIG. 2, the same frequency as the pulses $I_1$–$I_4$ and opposite sign and are of such a magnitude that two concurrent pulses of the same value are capable of reversing the magnetization of a core while one pulse alone is not capable thereof. Such current is therefore called a half-size current. It is expedient to produce the $i$-pulses by differentiating I-pulses and to amplify the pulses occurring as a consequence of the disappearance of the I-pulses.

As will appear from FIG. 1, pairs of conductors $K_{101}$ and $k_{101}$, $K_{102}$ and $k_{102}$, $K_{103}$ and $k_{103}$ pass through each of the cores in columns 101, 102 and 103, while only one conductor $K_{104}$ is passed through the cores in column 104. In the conductors of the K-type there is induced a voltage pulse when the state of magnetization of a core in said column is reversed by an I-pulse, while the conductors of the $k$-type are passed by a half-size current originating from the Logical Unit LE and caused by voltages in the K-conductors, which half-size current shall occur simultaneously with a half-size current in a matrix row in order to bring a core into its 1-state.

FIG. 2 further shows a pulse train CP7, the period of time between subsequent pulses being $t$. The pulses of the pulse train CP7 are of positive sign, and are displaced in relation to the $i$-currents and the I-currents so that these currents cannot occur simultaneously with the CP7 pulses. The pulses CP7 are such currents as occur in the lines $L_{101,1}$ etc. dependent on information coming from the exterior. In columns 102 and 103, CP7 pulses also occur with negative sign and thereby bring the cores from their 1-state into their 0-state. In this connection it is of importance that the reversal of the magnetization is effected more slowly than in the other cases, for which reason the curve shape of CP7 exhibits slower rise and fall than is true for the other pulses mentioned previously. Due to this measure the voltage induced by the reversal of the magnetization is reduced, further details as to this point being given below.

In the logical unit LE, there is also a train of voltage pulses CP4 which occurs with positive sign and the same frequency as the CP7 pulses. These pulses occur after the I-pulses have disappeared and after the $i$-pulses have commenced, and stop the current in the lines $k_{101}$, $k_{102}$, $k_{103}$, $k_{104}$.

In the logical unit LE, there is also a current pulse train CP6 having the same frequency as CP7. The individual pulses of this pulse train CP6 start during the time interval wherein the pulses in the conductors $k_{101}$, $k_{102}$, $k_{103}$ and $k_{104}$ occur, and they terminate after these latter pulses have terminated but prior to the commencement of a subsequent I-pulse.

These conditions for the mutual phase-shift of the pulses are to be observed and are observed by the example shown in FIG. 3 for the time-course of the pulses. At the time $t_0$ an I-pulse commences, as will appear from the top row in FIG. 3. If the core through which the I-pulse passes in column 101 is in its 1-state, the pulse occurring due to the reversal of the magnetization produces a current $i_{101}$ (FIG. 3, second row) in the conductor $k_{101}$. The I-pulse terminates at the time $t_2$, and thereby starts an $i$-pulse (FIG. 3, third row); the $i$-pulse terminates at the time $t_3$.

At the time $t_4$ the pulse CP4 (FIG. 3, fourth row) occurs which stops pulse $i_{101}$. The pulse CP6 (FIG. 3, fifth row) commences at the time $t_1$ and terminates at the time $t_5$, the pulse CP7 (FIG. 3, sixth row) commences at the time $t_6$ and terminates at the time $t_7$. The time interval $t$ may as said above amount to 1 ms. and the moments $t_0$–$t_7$ may be distributed according to a linear time scale as shown in FIG. 3, however, other displacements are possible as well, if only the conditions referred to in the explanation of FIG. 2 are fulfilled.

The logical unit wherein the pulses transmitted from the matrix are processed, consists substantially of eight flip-flops: FF101, FF102, FF103, FF104, FF1, FF2, FF3 and FF4. The flip-flops FF101, FF102, FF103, FF104 are set by the pulses which are induced in the conductor of the K-type connected to the set-input $s$ of each flip-flop. The flip-flops are provided with a transformer to increase the amplitude of the input signals to a value sufficient to set the flip-flops before the signals reach a transistor base.

The four flip-flops FF101, FF102, FF103 and FF104 each have a re-set input $r$ and voltage pulses CP4 are supplied thereto from SP via a conductor $L_p$. The flip-flop FF101 is furthermore provided with an additional re-set input $r$, which is connected with an output conductor $O_4$ from a core 104K in LE.

Connected to the output of the flip-flops FF101, FF102 and FF103 are the previously mentioned conductors $k_{101}$, $k_{102}$ and $k_{103}$ which each pass the vertical columns of the matrix as well as the cores 102K, 103K and 104K. Thus, the conductor $k_{101}$ is passed through the cores 102K, 103K and 104K, the conductor $k_{102}$ is passed through the core 102K, and the conductor $k_{103}$ is passed through the core 103K so that the current pulses through the conductors will magnetize the cores in a positive sense. The conductor $k_{104}$ connected to the output of flip-flop FF104 does not pass any column in the matrix and is passed through the core 104K so that the current pulse of the conductor will magnetize the core in the positive direction.

All flip-flop output conductors are connected to the minus terminal of a voltage source (not shown). The input conductors $K_{101}$, $K_{102}$, $K_{103}$ are, as mentioned above, at their one end connected to the inputs $s$ of the flip-flops, whereas their other ends, via a further conductor not shown, communicate with the other terminal of the input transformer, these other transformer terminals being connected to each other and likewise to all of the emitters of the flip-flops; in the following this junction is referred to as earth.

Each of the cores 102K, 103K and 104K is brought into its 1-state by combinations of current pulses from FF101 with pulses from FF102, FF103 and FF104, respectively; however, 102K and 103K may be prevented therefrom by an inhibitor current through a conductor $k_{123}$ which will be referred to later.

The core 104K is passed by a pulse current (CP6, FIG. 2) which will bring the core into the 0-state each time an I-current has occurred in the matrix while the cores 102K and 103K are brought into their 0-state by another current pulse ($I_k$, FIG. 2) each time the bottom row in the matrix has been asked, i.e. has been passed by an I-pulse.

Dependent on the magnetizing state of the cores 102K, 103K and 104K, bi-stable flip-flops FF2, FF3 and FF4 are controlled, which together with a mono-stable flip-flop FF1 transmit control orders to the operating system. In addition thereto FF2 and FF1 are controlled by pulses supplied through a line LS from the lift cage when it passes one of the points in the lift shaft indicating that the motor momentarily coupled is to be disconnected, and that the mechanical brake has to be actuated, if the cage is to stop at the floor in question. For this purpose the set-input $s$ of FF1 and the re-set input of FF2 are connected with LS, and the set input $s$ of FF2 and the re-set input $r$ of FF3 are connected with a conductor $O_4$, which extends through core 104K and is connected to earth. Pulses are induced in conductor $O_4$ when the magnetization of core 104K is reversed. The $s$-terminal of FF3 is connected with a conductor $K_3$ extending through the cores 102K and 103K and being connected to earth; a voltage is induced in connector $K_3$ when the magnetization of one or both of the cores 102K and 103K is reversed. The input terminal 1 of FF4 is connected with earth by a conductor $O_3$ which extends through core 103K. A voltage is likewise inducted in this conductor $O_3$ when the magnetization of core 103K is reversed. The input terminal 2 of FF4 is connected with earth by a conductor $O_2$, which extends through a core 102K so that a voltage is induced in conductor $O_2$ when the magnetization of core 102K is reversed.

The flip-flop FF4 is arranged so as not to react to the pulses which are transmitted from the cores when they are brought from the 0-state to the 1-state, and not to react, either, when both cores are simultaneously brought from the 1-state to the 0-state, whereas it is brought into its one position when only one core is brought from its 1-state to its 0-state, and is brought into its other position when only the other core is brought from its 1-state to its 0-state.

The output circuits of the four flip-flops are connected in the following manner: The output conductor $k_1$ of FF1, the output conductor $k_2$ of FF2, and the output conductor $k_3$ of FF3 are connected with a common conductor $k_{123}$, passing through the cores 102K and 103K so that the current in the conductor prevents the cores from being brought into their 1-state.

The output terminals of FF1, FF2, and FF3 are furthermore connected to conductors $p_1$, $p'_1$, $p_2$, $p_3$ respectively, whereas the output terminals of FF4 and exclusively connected to conductors $p_4$ and $p'_4$; these last-mentioned conductors in turn are coupled with the operating system of the lift in order to re-transmit the respective orders to this system.

In the following it will be described how the plant is processing the received signals of a lift having two travelling speeds. Supposed in a first instance, that an external call be given in order to stop the travelling cage at the second floor. When the cage has reached a definite point opposite the second floor the winch motor is to be changed from high speed to low speed, called the creeping speed, and only when the cage has reached this speed, the cage is to be stopped at level with the desired floor. The procedure of changing to the lower speed is initiated in the following manner. The call has the effect that a positive CP7 pulse of the conductor $L_{101,2}$ of the core 101,2 brings the core into its 1-state, thereby effecting a periodic reversal of the magnetization of the core, which process continues after the CP7 pulses have terminated and, consequently, also takes place when the cage reaches the point in the lift shaft where the change to slow motor speed has to be effected.

This process of reversal of the magnetization will be explained at best by means of FIG. 4, where the topmost row shows the pulse CP7 coming from the exterior via the conductor $L_{101,2}$. This pulse brings the core 101,2 into its 1-state, and next time a current pulse $I_2$ (FIG. 4, 2nd row) occurs in the conductor $L_2$, the core is brought into its 0-state, whereby a voltage $V_{101}$ (FIG. 4, 3rd row) is induced in the conductor $K_{101}$. This voltage pulse causes that the flip-flop FF101 is set and transmits, with a little time delay according to the reaction times of the core and the flip-flop, a half-size current $i_{101}$ (FIG. 4, 4th row) through the conductor $k_{101}$. This current pulse is terminated by the voltage pulse CP4 (FIG. 4, 5th row) which resets FF101. Prior to the occurrence of CP4, the $I_2$-pulse has terminated and the $i_2$-pulse (FIG. 4, 6th row) occurs and, again, together with the current pulse $i_{101}$ brings the core 101,2 into its 1-state.

This process is repeated each time an $I_2$-pulse occurs if the core is in its 1-state until it, in a manner which will be described later, is brought back into its permanent 0-state. It should be noted that the state of magnetization of none of the other cores, neither in column 101 nor in row 2, had been reversed as these cores have only been passed by half-size currents of opposite polarity or by currents corresponding to their state of magnetization.

As previously mentioned, one of the cores in column 4 is brought into its 1-state each time the cage passes a point where brakes are to be actuated, if the cage is to be stopped at the next following floor. The brakes are, however, only actuated if at the same time a core in column 1 which is associated with the floor in question is likewise in its 1-state. This is here the case for the core 101,2 of floor 2, thus, when the core 104,2 is brought into its 1-state by a CP7-signal from the lift shaft through the line $L_{104,2}$, the next following $I_2$-pulse will reverse the magnetization of the core 101,2 as well as 104,2 and both flip-flops FF101 and FF104 will be set. The core 104K is thereby brought into its 1-state because FF104 transmits a half-size current through the conductor $k_{104}$ and FF101 at the same time sends a half-size current through the conductor $k_{101}$. When the core 104K has been brought into its 1-state two things are to happen, namely the call, which is registered in column 1 on the floor at which the cage is to be stopped, is to be erased and braking has to be initiated. The erasure is effected by FF101 being re-set prior to the occurrence of the current pulse $i_2$ (FIG. 4, 6th row), which requires FF101 to be re-set prior to the occurrence of $i_2$, dependent on whether core 104K has been brought into its 1-state. Consequently, it is necessary to investigate whether the core 104K is in its 1-state or in its 0-state prior to the occurrence of $i_2$ which means that the state of magnetization of the core is to be investigated each time an I-pulse has occurred. The investigation is effected by the current pulse CP6 (FIG. 3, 5th row) being sent through the core 104K twice in order to overcome the magnetization originating from the two half-size currents from the flip-flops FF101 and FF104 and moreover to bring the core into its 0-state. The pulse generated by CP6 in the conductor $O_4$ due to reversal of the magnetization of the core 104K, re-sets FF101, and the core 101,2 remains in its 0-state until it is brought into its 1-state by a CP7 current pulse through $L_{101,2}$.

The pulse in conductor $O_4$ sets the flip-flop $FF_2$, which via the conductor $p_2$ transmits the order to couple the slow-speed motor and re-sets the flip-flop FF3 which thereby gives the order via conductor $p_3$ to decouple the high-speed motor.

It should be noted that the core 104,2 like all cores in column 104 can only be set in its 1-state so long as current pulses are coming from the lift shaft as the cores are not provided with magnetization lines corresponding to the lines $k_{101}$, $k_{102}$, $k_{103}$, and they are not provided with the lines $l_1$, $l_2$, $l_3$ and $l_4$ either and therefore cannot be exposed to corresponding magnetization pulses.

After the transmission of the braking order and after the cage has reached its creeping speed it is to be stopped. This is effected in the following way. For each floor, consequently also for floor No. 2, means is provided in the shaft which cause a pulse to be transmitted to the conductor LS, when the cage is located at the place where the operation of the mechanical brake has to be started. This pulse re-sets $FF_2$ which via the line $p_2$ transmits the order to decouple the motor rotating at creeping speed and to operate the brake. The same pulse sets the mono-stable flip-flop FF1. This flip-flop re-sets itself after some time which is chosen so great as to leave sufficient time for unloading and loading the cage prior to another start which can take place only after the resetting of FF1.

As previously mentioned, the position of the cage is registered in columns 102 and 103 by the cores in column 102 being brought into their 1-state when the cage is above the said floor, and the cores in column 103 being brought into their 1-state when the cage is below the said floor. As long as the registered position of the cage is not altered there will, as described in connection with column 101, be effected a periodical reversal of the magnetization of the cores in the two columns which are brought into their 1-state.

If the cage arrives at the point below a floor where a new position is to be registered in column 102, the previous registration is to be altered into the new one by bringing the core belonging to the said floor from its 1-state to its 0-state when the cage travels downwards, and from its 0-state to its 1-state when the cage travels upwards. When the cage is travelling upwards, an arrangement on the cage and in the shaft generates positive CP7 pulses in the conductor of the cores $L_{102}$ and thereby brings the core into the 1-state. The same arrangement generates negative CP7 pulses in $L_{102}$-conductor when the cage is travelling downwards and thereby brings the core into its 0-state.

By these alterations a voltage pulse is induced in the K-conductor of the column. When the core is brought from its 0-state to its 1-state the voltage pulse has a polarity which leaves the pulse ineffective. When changing from 1 to 0 takes place, however, the pulse is effective if it has sufficient amplitude. Therefore, the CP7 pulse has a flank steepness which is so small that the voltage induced in the K conductor of the column which by reversal of the magnetization of the cores is not capable of producing an operative signal. In a corresponding manner the registration in column 103 is altered when the cage reaches a point below the floor. The points in the lift shaft where the registration is altered may expediently be the same points where the braking is to be initiated if the cage is to be stopped at the floor. Therefore, 1 pulse can set the cores in a floor in columns 102 and 104 at 1 and another pulse can set the cores in a floor in columns 103 and 104 at 1.

When the time determined by FF1 has expired, decisions are made as to whether the cage is to travel again, and, if so, in which direction it is to travel. This decision is initiated by investigating whether there is a call above or below the instantaneous position of the cage. On the basis of the result of this investigation, the direction of the travelling is determined according to the following lines of direction: If a call has only been made above the cage, the cage is to travel upwards, if a call has only been made below the cage, the cage is to travel downwards, and if there is a call both above and below the cage, the cage is to continue in the direction it had when it reached the floor. The cage has to travel if there is a call either above or below the cage otherwise it has to remain in its position.

A call to a floor below the instantaneous position of the cage is the same as a call to a floor above which the cage is located at present. The call is registered in column 101 in the row corresponding to the calling floor and if the cage is above said floor, the core in the same row in column 102 is in the 1-state. Thus, if in the same row both cores in columns 101 and 102 are set at 1, then there is a call below the instantaneous position of the cage. This combination is registered in the previously mentioned manner in core 102K by passing current pulses from FF101 and FF102 through said core. In a corresponding manner core 103K registers that there is a call above the instantaneous position of the cage.

On the basis of the magnetization of the cores 102K and 103K the further decision is made by bringing the cores back to their 0-state whereby the flip-flops FF3 and FF4 are affected. In this case, however, the CP6 pulses cannot be used as an interrogating current, as they can in conjunction with the braking action, since it is not possible to make a decision due to action information received only from one floor but information therefore is required from all floors. The cores 102K and 103K are therefore brought into their 0-state by $I_K$ which occurs after the cores on all floors having been under the influence of I-currents.

If the cage is located at the third floor, cores 102,3, 103,3 and 103,2 are in their 0-state while cores 103,4, 102,2 and 102,1 are in their 1-state. If there is only a call on the third floor or if there is no call at all, none of the cores 102K and 103K will be set at 1. In case of a call on the fourth floor core 103K will be set at 1, and in the case of call on the first or second floor, core 102K will be set at 1. The first current pulse $I_K$, occurring after the current through $k_{123}$ has disappeared, will, if there is a call above or below the position of the cage, induce a voltage in the conductor $K_3$ so that FF3 is set and then in turn feeds a signal via conductor $p_3$ to connect the high-speed motor to circuit.

The same current pulse $I_K$ induces a pulse in the conductor $O_2$ if there is a call below the cage, and in the conductor $O_3$ if there is a call above the cage. These voltages alter the position of FF4 in the following manner: If both voltage pulses occur at the same time, nothing will happen, which means that the cage will continue to travel in the direction in which it arrived at the floor. If a pulse is supplied conductor $O_2$ alone indicating that there is only a call below the cage, FF4 will of course change to its down-state and give order to travel down. If in a corresponding manner a pulse has been supplied only by conductor $O_3$, FF4 will change to its up-state and allow upward travel of the cage. Change of travelling direction and start of the cage must take place only when the cage stands still and when the period determined by the flip-flop FF1 has passed since the last stop of the cage.

When the cage is travelling, one of the flip-flops FF2 and FF3 is set and during the time the cage remains at a floor, FF1 is set; each of these three flip-flops sends, when set, a current through the conductor $k_{123}$ and thereby through cores 102K and 103K, thereby preventing the cores from being brought into their 1-state.

It has previously been mentioned that the state of magnetization of the cores in columns 102, 103 and 104 is dependent on the position of the cage in the lift shaft.

This state of magnetization is controlled by pulses transmitted from the shaft by means of an arrangement consisting of transmitter coils disposed on the cage, which transmit signals to receiver coils disposed in the shaft for each floor and activated inductively by passage of current. Such an arrangement known per se is shown in FIG. 5. A transmitter coil A' surrounds the yoke of a U-shaped core U of magnetic material. The entire arrangement is secured to a lift cage or a similar conveying member which is moved in the directions indicated by arrows which may be horizontally or vertically. Along the path of motion there are different stops which define the intervals of movement and the control has to be such that the cage may stop at the stops or pass the stops according to the public's signals or according to a certain programme or according to a combination thereof. For this purpose signals are transferred to receiver coils M having a core V of magnetic material which coils are arranged in a row in the path of movement of the cage—in the case of a lift they are placed in the shaft—at the places where information as to the position of the cage is to be supplied to the control system. The coils M must therefore be positioned so that a voltage pulse is induced which produces a current pulse in an associated winding of a memory core so that the core is brought into positive saturation, the 1-state, or negative saturation, the 0-state, dependent on the polarity of the current pulse. The state of saturation is determinative in such a case for the orders processed in the control system of the lift.

In order to assure the pulse induced in the coils M is of sufficient size, this pulse has to occur at the moment when the magnetic coupling between the coils A' and M is great, that is when coil M is located between the legs of the core U or at a little distance therefrom in either direction of movement. The frequency and amplitude of the current pulses are to be chosen in conformity with this requirement. The sign of the pulses is dependent on the direction of pulses occurring in coil A'. The pulse generator of coils A' must therefore be so controlled as to produce pulses having a sign being dependent on the direction of movement of the cage. However, two transmitter coils may also be provided which carry pulses of different directions, so that only one coil is always effective depending on the direction of movement.

FIG. 6 illustrates a particularly expedient embodiment according to which two transmitter coils always transmit pulses of opposite polarity. The memory cores in which the current pulses originating from the receiver coils will become effective, are designated by $H_1 \ldots H_4$. These cores are connected with receiver coils $M_1 \ldots M_4$, which are arranged in the shaft and divide the path of the cage into a number of intervals. On the cage S, or the carriage in the case of horizontal movement, there are mounted two transmitter coils $A_1$ and $A_2$, which are passed by current pulses of different directions so that they produce pulses of different polarity in the coils M and through the cores H. A pulse originating from the coil $A_1$ will bring a memory core into its 0-state, and a pulse originating from coil $A_2$ will bring the same core into its 1-state, if the coils $A_1$ and $A_2$ are arranged at such mutual distance that their fields do not overlap each other and that they pass the receiver coils successively. A memory core in the 0-state means in such a case that the carriage is located to the right, a core in the 1-state means that the carriage is located to the left of the point of mounting of the associated coil M.

The arrangement operates in the following manner. I assume that all of the M coils are arranged at the same side of the floors, e.g. above the floors and that the carriage S, which is shown in FIG. 6, has passed the coils $M_1$ and $M_2$; the cores $H_1$ and $H_2$ or the corresponding cores 102,1 and 102,2 in the matrix A are then set at 0, the cores $H_3$ and $H_4$ at 1, whereby the core $H_3$ corresponds to 102,3, while a core corresponding to $H_4$ is not shown in the matrix since the latter is only applicable to four floors. But the matrix may without difficulty be arranged to comprise more floors, so that there is a core 102,4 corresponding to $H_4$. If the carriage is moved towards the coil $M_3$, the pulses in $A_2$ will first produce a current in $M_3$, which sets $H_3$ at 1. Next $A_1$ passes by $M_3$ whereby $H_3$ will be set at 0, so that the interval between $M_3$ and $M_4$ now differs from the other intervals in that it is the only one the limits of which are assigned to cores of different states of saturation and this means that the carriage is within these interval limits. At the travel of the carriage towards the left, $A_1$ first passes $M_2$, and $H_2$ will be set at 0, that is, that the core maintains its state of saturation; next $A_2$ passes $M_2$, and $H_2$ will be set at 1, whereby it is registered that the carriage is now located between $M_1$ and $M_2$ (102,1 and 102,2).

For the purpose of ascertaining the state of saturation of the cores, interrogating pulses I are used which pass through the cores in the conductors $L_1, L_2 \ldots$ (FIG. 1) and hereby induce pulses in the output winding $K_{102}$.

These pulses are processed in the flip-flop FF102 of the logical unit LE.

In the circuit arrangement illustrated in FIG. 6 erroneous registrations may take place if a disturbance should occur in the system. In such a case the error should be eliminated as quickly as possible, that means at the next indication. This is achieved by means of the circuit arrangement shown in FIG. 7. In the arrangement as here illustrated, the position of the carriage is registered in the same manner as in connection with the circuit arrangement of FIG. 6, i.e. the four limits of the three intervals are assigned to four memory cores $H_1 \ldots H_4$, but at all interval limits—except at the extreme ones—there are placed two receiver coils so as to provide one set of M coils and one set of N coils. At the first interval limit, the first floor, there is provided an M coil, the coil $M_1$, the second and the third floor each have an M and an N coil, i.e. the coils $M_2$ and $N_2$ and $M_3$ and $N_3$, respectively, while the last and fourth floor is provided only with one N receiver coil, viz. the coil $N_4$.

The coils of each set are so arranged, that their magnetic fields have no influence on each other, and that each set can only be induced by voltage pulses from its transmitter coil arranged at the carriage; M is influenced by coil $A_1$ and N is influenced by coil $A_2$. The pulses from the $A_1$ coil are hereby only transmitted when the carriage is moved to the right, and the pulses from the $A_2$ coil are transmitted only when the carriage is moved to the left (which is indicated by arrows in the figure), and the pulses generated in the M and N coils by the currents through the $A_1$ and $A_2$ coils have the same sign. A pair of receiver coils with one coil of the M group and one coil of the N group, the coils being situated at the limits $M_1$ and $N_2$, $M_2$ and $N_3$, $M_3$ and $N_4$ of an interval is so connected in series that the pulses generated therein operate in the same direction. Each of the series connections is passed through each of the four memory cores in such a manner that the pulses in each M coil bring the associated H core and all the H cores lying at one side thereof, into one saturation state (the 0-state), and bring all the cores lying at the other side into the other state of saturation (the 1-state). Thus, a pulse from $M_2$ sets the cores $H_2$ and $H_1$ at 0, the cores $H_3$ and $H_4$ at 1.

This arrangement corrects an erroneous indication at the next following interval limit in the following manner. For the carriage position as shown in FIG. 7, the cores $H_1$ and $H_2$ shall be set at 0, and the $H_3$ and $H_4$ cores shall be set at 1 in conformity with the above. If now, on account of a disturbance, $H_1$ has been set at 1, and the carriage is travelling to the right, a pulse is induced in $M_3$ which brings the cores $H_1$, $H_2$ and $H_3$ into the 0-state and the core $H_4$ into the 1-state, irrespectively of the previous state of magnetisation of the four cores so that the erroneous indication is corrected.

What I claim is:

1. A control circuit for lifts or the like, movable between individual floors, comprising a number of magnetic memory cores adapted to be alternatively in a first zero-state, and a second one-state of saturation, said cores forming a matrix having horizontal rows corresponding to respective floors, and vertical columns, first circuits, each of said circuits being associated with one corresponding row, second circuits, each of said second circuits being associated with one of said columns, means to generate first interrogating pulses in said first circuits, those of said first interrogating pulses generated in first circuits associated with rows corresponding to subsequent floors being displaced in relation to each other by a predetermined period of time $t$ and those of said first interrogating pulses generated in first circuits associated with the rows corresponding to the last and the first floor being displaced in relation to each other by a period of time $2t$, means to apply second information pulses to said cores corresponding to each floor, said information pulses being adapted to bring a corresponding core from its zero-state to its one-state, and said interrogating pulses having a magnitude adapted to bring a corresponding core back from its one-state to its zero-state, means to generate third pulses in said second circuits when said cores are brought back from their one-state to their zero-state by said interrogating pulses, whereby said third pulses serve to contribute to the control order.

2. A control circuit according to claim 1, comprising furthermore a logical unit having further memory cores, said further cores being adapted to be magnetized by said third pulses in such a way that a first group of said further cores affects selected pairs of said third pulses independently of pulses belonging to all the other rows, whereas the remaining groups of said further cores affect selected pairs of said third pulses in such a way that pulses belonging to all the rows determine the type of the control order.

3. A control circuit according to claim 1, comprising furthermore third circuits, each of said third circuits associated with one corresponding horizontal row, means to generate fourth current pulses in said third circuits having the same frequency and the opposite polarity as said first interrogating pulses and an amplitude at least half as great as but less than the amplitude required to reverse the magnetization of a core, said fourth current pulses being generated at the same period of time as said third pulses.

4. A control circuit according to claim 3, wherein said means to generate said fourth current pulses comprise differentiation means adapted to generate said fourth current pulses due to the termination of said first interrogating pulses.

5. A control circuit according to claim 3, wherein means are provided to generate fifth voltage pulses adapted to terminae said third current pulses after termination of respective interrogating pulses and after commencement of respective fourth current pulses.

6. A control circuit according to claim 4, wherein said means to apply said second information pulses to said cores comprise means to generate all said first information pulses at the same frequency, said frequency corresponding to said period of time $t$, and in such a manner that they commence only after termination of an interrogation pulse and a subsequent fourth pulse and that they terminate before a subsequent interrogation pulse commences, and that the flank steepness of said information pulses is so that no operative signal is transmitted by one of said cores to one of said associated circuits.

7. A control circuit according to claim 1, wherein said means to apply said second information pulses to said cores comprise a push-button panel provided in the lift cage and push-buttons provided at the individual floors between which said lift is movable, said push-buttons being adapted to bring cores of one vertical column of said matrix into their one-state dependent on the floor at which said cage is to be stopped.

8. A control circuit according to claim 1, wherein said means to apply said second information pulses to said cores comprises an arrangement provided in the shaft of said lift, said arrangement being adapted to bring cores of different horizontal rows and of one vertical column of said matrix into their one-state when said cage is above the floor to which the respective row containing said core corresponds, and to bring said cores of said one vertical column into their zero-state, when said cage is at or below the floor to which the respective row containing said core corresponds.

9. A control circuit according to claim 8, wherein said arrangement is furthermore adapted to bring cores of one second vertical column of said matrix into their one-state when said cage is below the floor to which the respective row containing said core corresponds and to bring said cores of said second vertical column into their zero-state, when said cage is at or above the floor to which the respective row containing said core corresponds.

10. A control circuit according to claim 1, wherein said means to apply said second information pulses to said cores comprises an arrangement provided in the shaft of said lift, said arrangement adapted to bring cores of one vertical column of said matrix into their one-state when said cage during its travel along the shaft passes a point in said shaft in which brakes are to be actuated if the cage is to be stopped at that floor.

11. A control circuit according to claim 9, wherein said arrangement adapted to magnetize said cores of said first and said second vertical column is comprised of a first and a second transmitter coil provided at the cage, and of receiver coils mounted in said shaft in accordance with said individual floors, said transmitter coils adapted to transmit pulses, pulses transmitted by said first transmitter coil being of a polarity opposite to the polarity of pulses transmitted by said second transmitter coil, said coils being spaced from each other so that their respective magnetic fields do not overlap each other, and being adapted to successively pass said receiver coils when said cage travels along said shaft.

12. A control circuit according to claim 11, wherein at one time only one of said transmitter coils transmits pulses, dependent on the direction in which cage travels along said shaft.

13. A control circuit according to claim 11, wherein each of said coils is adapted to transmit pulses of opposite polarity dependent on the direction in which said cage is moved.

14. A control circuit according to claim 9, wherein said arrangement adapted to magnetize said cores of said first and said second vertical columns is comprised of a first and a second transmitter coil provided at the cage and of a first and second set of receiver coils mounted in said shaft at limits of intervals corresponding to the distance between adjacent floors, only one of said transmitter coils at a time being adapted to transmit pulses, dependent on the direction in which said cage travels, said first coil adapted to influence a receiver coil of said first set and said second coil adapted to influence a receiver coil of said second set, receiver coils of said first and second set located at subsequent limits of an interval being series-connected in pairs so that voltages induced in either of said receiver coils of one pair operate in the same direction.

15. A control circuit according to claim 14, wherein each pair of said series-connected coils is connected through all of the memory cores of one of said first and said second vertical columns, respectively, in such a manner, that a pulse flowing through one of said pairs of coils brings the memory core assigned to the respective coil belonging to said first set of coils and further memory cores assigned to floors on one side of the floor to which the latter mentioned memory core is assigned, into their one state of magnetization, and brings the memory cores assigned to remaining floors into their other, opposite state of magnetization.

16. A control circuit according to claim 2, comprising furthermore third circuits, each of said third circuits associated with one corresponding row, means to generate fourth current pulses and said third circuits having the same frequency and the opposite polarity as said first interrogating pulses and an amplitude at least half as great as and less than the amplitude required to reverse the magnetization of a core, said fourth current pulses being generated at the same period of time as said third pulses, said cores of said first group being passed by a conductor and means being provided to generate sixth interrogating pulses which have the same frequency as said second information pulses and have an amplitude capable of both cancelling the ampere windings produced by said third and said fourth current pulses and capable of producing sufficient ampere windings to reverse the magnetization of said memory cores, said sixth pulses passing through said conductor passing said cores of said first group, and commencing during the period when said third pulses pass said second circuits associated with the first and the last vertical column of said matrix.

17. A control circuit according to claim 16, wherein cores of said remaining groups are passed by a conductor and wherein means are provided to generate seventh interrogating pulses having the same frequency as said first interrogating pulses and being displaced in relation to said first interrogating pulses generated in a first circuit associated with the first floor by a period of time $t$.

References Cited by the Examiner

UNITED STATES PATENTS 2,806,554   9/57   Hall et al. _____ 187—29
3,040,838   6/62   Suozzo et al. _____ 187—29

OTHER REFERENCES

Textbook: "Digital Applications of Magnetic Devices," Meyerhoff et al., John Wiley & Company, New York, 1960, TK–7888.3–M4–C.5, pages 92, 93.

ORIS L. RADER, *Primary Examiner*.